Oct. 26, 1965  V. J. MAYCHARK  3,214,202
QUICK ACTING PIPE COUPLING
Filed June 22, 1962  3 Sheets-Sheet 1

INVENTOR.
VALENTINE J. MAYCHARK
BY Clark Ott
ATTORNEYS

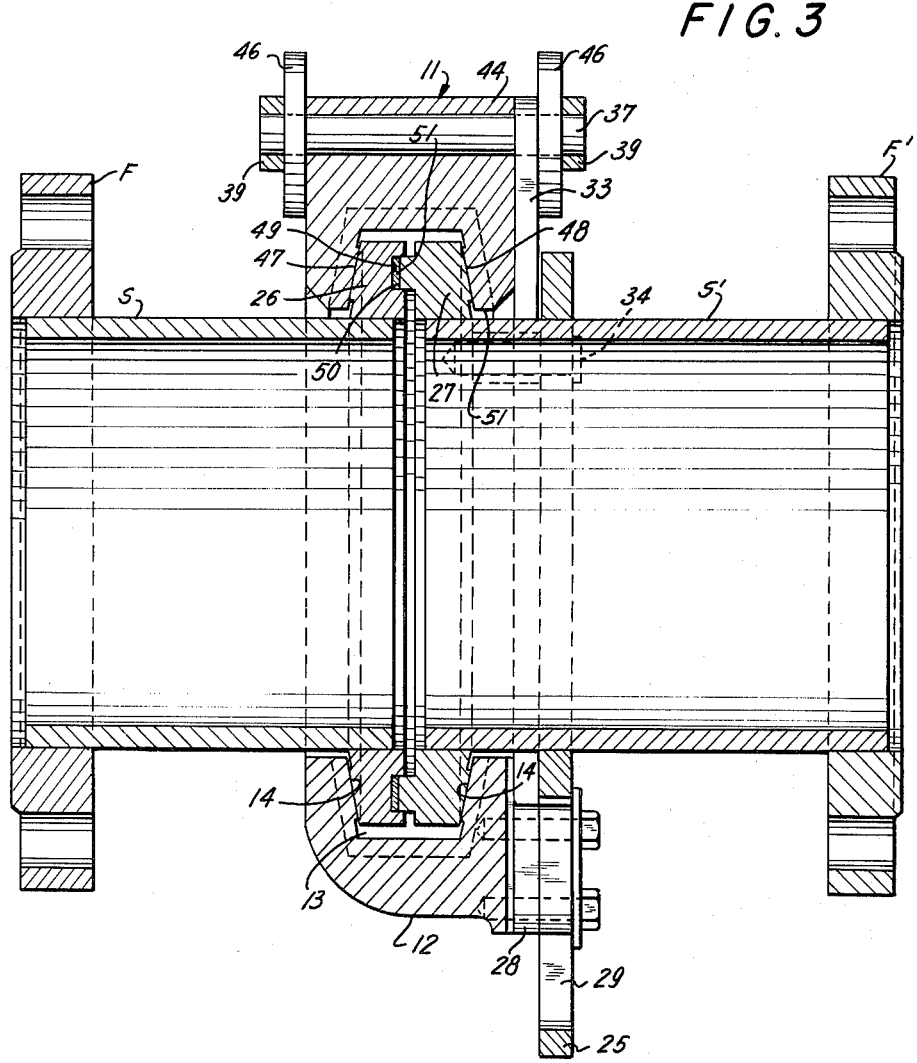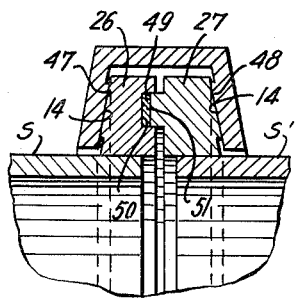

Oct. 26, 1965    V. J. MAYCHARK    3,214,202
QUICK ACTING PIPE COUPLING
Filed June 22, 1962    3 Sheets-Sheet 3

INVENTOR.
VALENTINE J. MAYCHARK
BY
Clark Ott
ATTORNEYS

United States Patent Office 3,214,202
Patented Oct. 26, 1965

3,214,202
QUICK ACTING PIPE COUPLING
Valentine J. Maychark, 171 Hillcrest Ave., Leonia, N.J.
Filed June 22, 1962, Ser. No. 204,316
3 Claims. (Cl. 285—364)

This invention relates to a quick acting pipe coupling.

An object of the invention is to provide a quick acting pipe coupling adapted for use in installations requiring substantially instantaneous release of a pipe joint such as in a pipe connected with a liquid cargo vessel and the like which due to the usual marine hazards or other conditions the vessel must be substantially instantaneously released.

Another object of the invention is to provide a quick acting pipe coupling which is adapted to be moved to coupling and uncoupling relation with a pipe joint by the throwing of a single handle lever.

Still another object of the invention is to provide a quick acting pipe coupling which engages the ends of a pipe joint with equal pressure continuously throughout the periphery thereof.

Still another object of the invention is to provide a quick acting pipe coupling of said character in which the handle lever when swung to one position retains the coupling in coupling relation on the pipe connection.

The invention comprehends a quick acting pipe coupling which consists of arcuate sectors carried by one of the pipe sections for movement thereof to and from impinging tightened relation with flanged ends of the pipe joint by swinging movement of a hand lever connected with two of the arcuate sectors by links mounted for pivotal swinging movement on said pipe section.

With the foregoing and other objects in view, reference is now made to the following specification and accompanying drawings in which the preferred embodiment of the invention is illustrated.

In the drawings:

FIG. 3 is a transverse sectional view taken approximately on line 3—3 of FIG. 1.

FIG. 4 is a fragmentary sectional view taken approximately on line 4—4 of FIG. 1.

Figure 1:
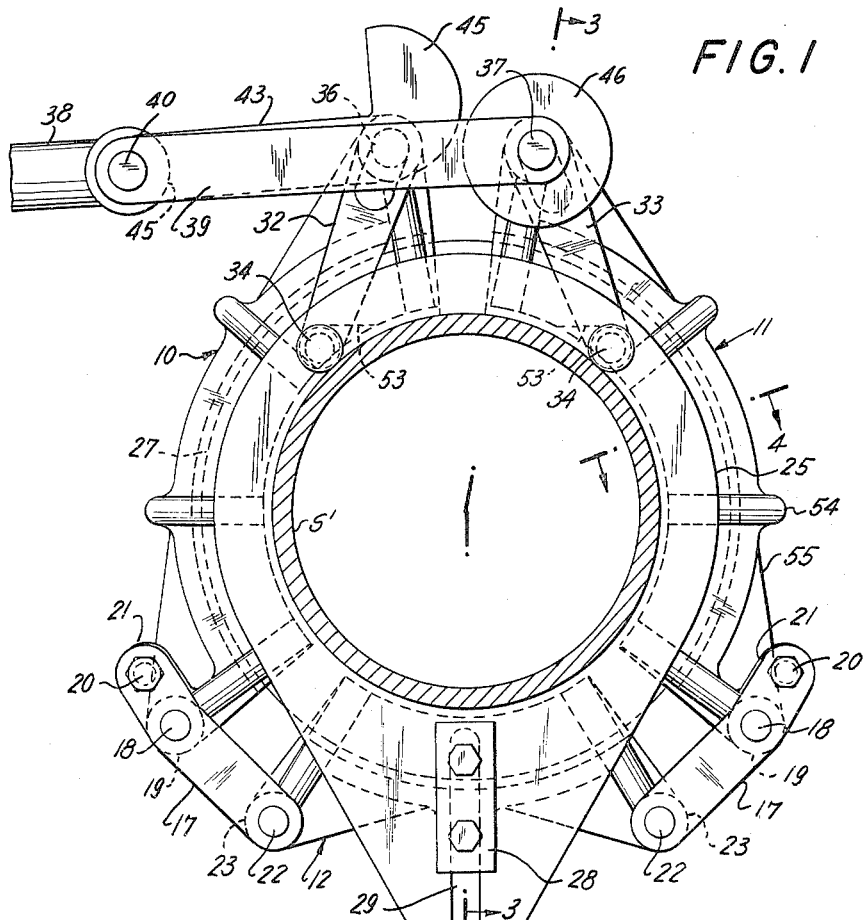
FIG. 1 is a view in side elevation of a quick acting pipe coupling constructed in accordance with the invention and illustrating the same in impinging clamping relation on a pipe joint.
Figure 2:
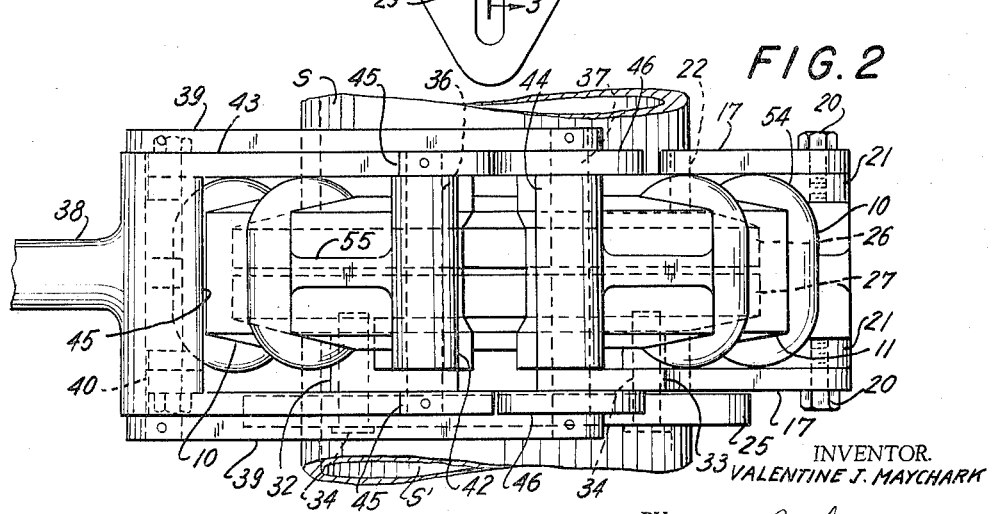
FIG. 2 is a top plan view of the pipe coupling shown in FIG. 1.
Figure 5:
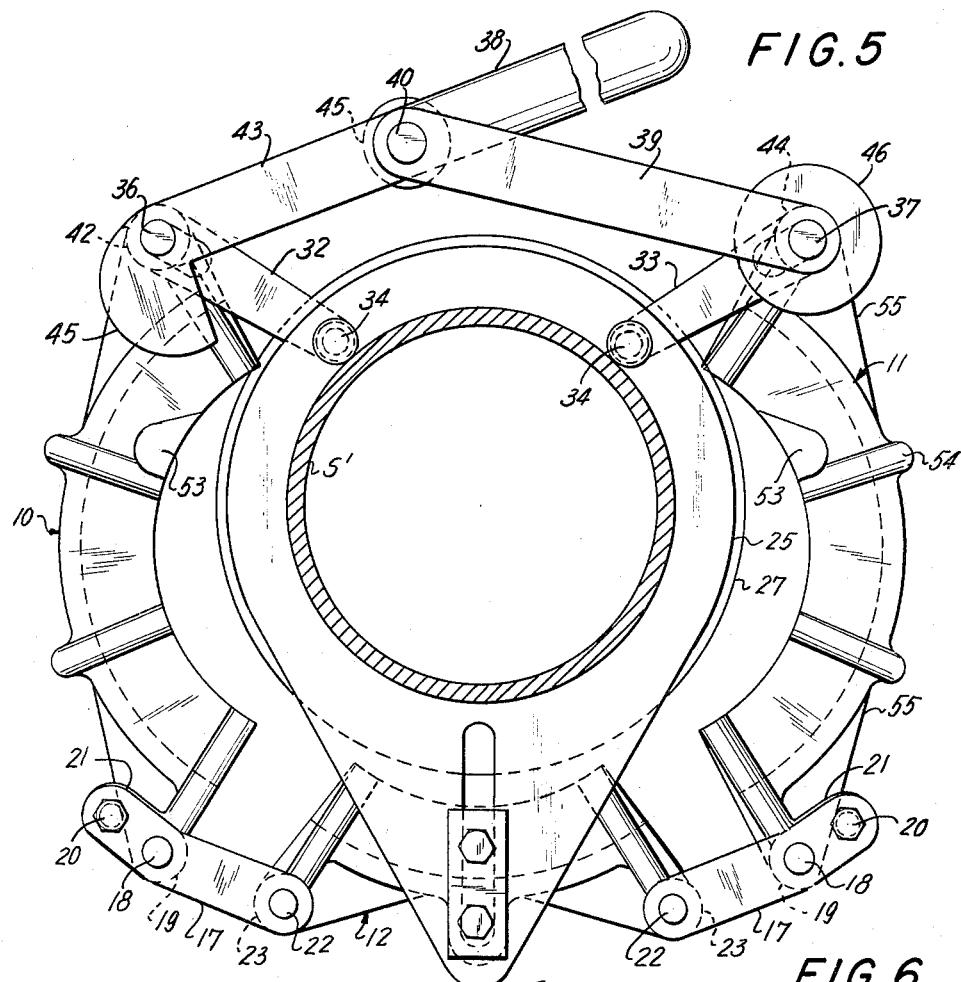
FIG. 5 is a view similar to FIG. 1 but illustrating the pipe coupling in uncoupling relation and the pipe joint released from coupled relation.
Figure 6:
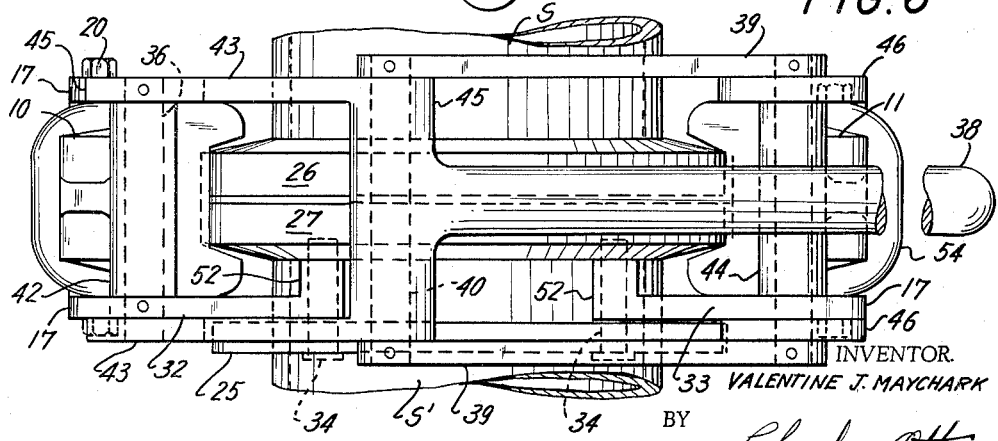
FIG. 6 is a top plan view of the pipe coupling as shown in FIG. 5.

Referring to the drawings, the quick acting pipe coupling embodying the invention is shown in its application to the coupling of two pipe sections S and S' to provide a leakproof joint. The coupling provides means by which the pipe sections may be expeditiously coupled and uncoupled without the necessity of fastening or loosening other securing means. One of the pipe sections may be connected with piping leading to a tank on a cargo vessel and the other section may be connected with piping leading to a tank on shore for pumping liquid into the vessel or from the vessel into the tank on shore.

The coupling includes similar coupling sectors 10 and 11 and an intermediate coupling sector 12. Each of said sectors is of arcuate shaped formation corresponding substantially in curvature to that of the pipe sections and each is formed with a channel 13 which extends outwardly from its inner periphery and opens through the ends thereof with the opposite side faces 14 of the channels flaring toward the inner peripheries of the sectors to provide channels of wedge-shaped formation in section. The sectors 10 and 11 are spaced from the intermediate sector 12 and are connected therewith by straps 17 which are disposed against the side faces thereof. The straps bridge the space between the sectors 10 and 12 and between the sectors 11 and 12 and are affixed to the sectors 10 and 11 against turning movement by pins 18 extending through the enlarged outer end portions 19 thereof and by bolts 20 extending through bosses 21 formed on said end portions 19. The straps are pivotally connected with the intermediate sector 12 on pivots 22 extending through bearings 23 at the ends thereof. The straps thus connect the sectors together in continuous formation with the channels 13 disposed in aligned relation.

The coupling sectors are mounted on a collar 25 affixed to the pipe section S' for movement of said sectors to dispose the channels thereof in impinging tightened relation on mating flanges 26 and 27 mounted on the confronting ends of the pipe sections S and S' respectively. The intermediate coupling sector 12 is slidably connected with the collar 25 by key and keyway slot 28 and 29 carried by said sector and collar respectively with the keyway extending radially of the pipe section S' and medially of said coupling sector. The coupling sectors 10 and 11 are swingably connected with the collar 25 by links 32 and 33 which are pivotally connected at their inner ends with the collar on headed pins 34 threadedly anchored in the flange 27 and at their outer ends said links are pivotally connected with the sectors 10 and 11 on pivot pins 36 and 37 respectively. A handle member 38 is pivotally connected with the sector 10 by said pivot pin 36 and links 39 are pivotally connected with the sector 11 by said pivot pin 37 and are pivotally connected with the handle member 38 by a pivot pin 40 for combined swinging movement of said sectors 10 and 11 and sliding movement of the intermediate sector 12 to and from said impinging tightened relation with the said pipe sections S and S' by swinging movement of the handle member.

The coupling sector 10 is formed with a bearing 42 at the upper end thereof in which the pivot pin 36 is journaled with the ends of the pivot pin keyed or otherwise affixed in openings in the oppositely disposed side portions 43 of the handle member 38 formed by bifurcating the inner end thereof. The bearing 42 is disposed between said side portions 43 and with the link 32 arranged on said pivot pin between said bearing and one of said side portions 43. The sector 11 is provided with a bearing 44 at the end thereof in which is journaled the pivot pin 37 with the ends of said pivot pin keyed or otherwise secured in openings in the outer ends of said links 39 and with the link 33 pivotally mounted on said pivot pin at one end of said bearing 44. The handle member 38 is provided with a bearing 45 located forwardly of the bifurcated inner end thereof in which bearing the pivot pin 40 is journaled with the ends of said pivot pin keyed or otherwise secured in openings in the inner ends of said links 39. The handle 38 thus constitutes a toggle lever which rocks on the pivot pin 36 for swinging the links 32 and 33 from outward divergent relation to outward converging relation to effect movement of the coupling sectors from expanded to clamping relation with the flanges of the pipe sections and vice versa. When in clamping relation the side portions 43 of the handle member together with the bearing 42 of the sector 10 are disposed between the links 39 which are relatively longer than the side portions 43 of the handle member and also when in clamping relation the pivot pin 40 is out of alignment with the pivot pins 36 and 37 whereby the handle is retained in such position and the coupling sectors are retained in clamping relation with the flanges of the pipe sections.

The side portions 43 of the handle member terminate in arcuate cams 45 which are disposed in alignment with rollers 46 mounted on the pivot pin 37 inwardly of the links 38. The cams 45 are spaced from the rollers 46 when the handle member is swung to clamp the coupling sectors in clamping relation with the flanges of the pipe sections and when the handle member is swung to move the sectors to expanded relation the cams 45 engage the rollers 46 to initially cam the coupling sectors 10 and 11 towards expanded relation. Further swinging movement of the handle member swings the links 32 and 33 to outwardly divergent relation to thereby swing the coupling sectors 10 and 11 outwardly and slide the intermediate coupling sector 12 outwardly in the keyway slot 29 to fully expanded relation out of engagement with the flanges of the pipe sections.

The flanges 26 and 27 are welded or otherwise affixed to the confronting ends of the pipe sections S and S' respectively and said flanges have angulated side faces 47 and 48 which together correspond to the wedge-shaped formation of the channels 13 of the coupling sectors. The flange 26 is provided with an angular recess 49 in the inner face thereof while the flange 48 is provided with an annular rib 50 which slidably fits the recess 49 and disposed between said rib and the bottom of said recess is a compressible packing ring or gasket 51 for sealing the joint therebetween when the coupling sectors are tightened on the flanges. When in tightened relation the flanges are spaced from the inner walls of the channels 13 and the coupling sectors are spaced from the pipes S and S' whereby the coupling sectors may be tightly wedged on the flanges so as to tightly compress the packing or gasket 51 therebetween.

The links 32 and 33 have bearings 52 which extend inwardly against the outer side faces of the flange 27 through which bearings the headed pins 34 engage for swinging movement of said links on said pins and one of the side walls of each of the coupling sectors 10 and 11 is recessed as at 53 to receive therein the bearing end 52 to permit of the movement of said coupling sectors into clamping relation with the pipe sections.

The coupling sectors 10 and 11 are formed with arcuately spaced transversely extending strengthening ribs 54 and the coupling sectors 10, 11 and 12 are formed with medial strengthening webs 55 extending longitudinally at the ends thereof. The coupling sectors as well as the links 32 and 33 and the handle member 38 are preferably formed of manganese bronze or the like to provide sufficient strength and hardness to withstand the required pressure for tightening the sections on the flanges of the pipe joint.

The pipe sections S and S' are provided with standard flanges F and F' at the outer ends thereof which are adapted to be bolted to piping leading to a tank on a cargo vessel and to a tank on shore as hereinbefore explained.

While the preferred form of the invention has been shown and described herein, it is to be understood that the same is not so limited but shall cover and include any and all modifications thereof which fall within the purview of the invention.

What is claimed is:

1. In a pipe coupling for coupling together the confronting flanged ends of two pipe sections, oppositely disposed coupling sectors, an intermediate coupling sector disposed between said oppositely disposed sectors, means swingably connecting said oppositely disposed sectors with said intermediate sector, said sectors having longitudinally extending arcuate recesses provided with constricting side faces for impinging relation on said confronting flanged ends, a collar affixed to one of said pipe sections, means mounting said intermediate sector on said collar for rectilinear movement of said intermediate sector toward and away from said flanged ends, link means swingably connected with said oppositely disposed sectors and with said collar for swinging movement of said oppositely disposed sectors toward and away from said flanged ends, a lever member pivotally connected with one of said oppositely disposed sectors, and link means pivotally connected with the other of said oppositely disposed sectors and with said lever member for swinging movement of said lever member for moving all of said sectors from expanded relation to clamping impinged relation on said confronting ends of said pipe sections.

2. In a pipe coupling for coupling together the confronting flanged ends of two pipe sections, oppositely disposed coupling sectors, an intermediate coupling sector disposed between said oppositely disposed sectors, straps connecting said oppositely disosed sectors and said intermediate sector for swinging movement of said oppositely disposed sectors and rectilinear motion of said intermediate sector, said sectors having longitudinally extending arcuate recesses of wedge-shaped formation in section for impinging relation on said confronting flanged ends, a collar affixed to one of said pipe sections, said intermediate sector and said collar having a rectilinear sliding connection for movement of said intermediate sector toward and away from said flanged ends, link means pivotally connected with said oppositely disposed sectors at the outer ends thereof respectively and with said collar for swinging movement of said link means toward and away from each other for movement of said oppositely disposed sectors toward and away from said flanged ends, a lever member pivotally connected with one of said oppositely disposed sectors on the pivotal connection of one of said link means with said sector, and link means pivotally connected with said lever member and with the other of said oppositely disposed sector on the pivotal connection of the other of said link means with said other sector for swinging movement of said lever member for movement of all of said sectors from expanded relation to clamping impinging relation on said confronting end of said pipe sections.

3. In a pipe coupling for coupling together the confronting flanged ends of two pipe sections, oppositely disposed arcuate coupling sectors, an intermediate arcuate coupling sector disposed between and spaced from said oppositely disposed sectors, straps affixed to said oppositely disposed sectors against pivotal movement therewith and pivotally connected with said intermediate sector for swinging movement of said oppositely disposed sectors, said sectors having longitudinally extending arcuate recesses of wedge-shaped formation in section for impinging relation on said confronting flanged ends, a collar affixed to one of said pipe sections, said intermediate sector and said yoke having rectilinear sliding connection for movement of said intermediate sector toward and away from said flanged ends, first link means pivotally connected with said oppositely disposed sectors at the outer ends thereof respectively and with said collar for swinging movement of said link means toward and away from each other for swinging movement of said oppositely disposed sectors toward and away from said flanged ends, a lever member pivotally connected with one of said oppositely disposed sectors on the pivotal connection of one of said first link means with said sector, and link means pivotally connected with said lever member and with the other of said oppositely disposed sector on the pivotal connection of the other of said first link means with said other sector for swinging movement of said lever member for movement of all of said sectors from expanded relation to clamping impinging relation on said confronting end of said pipe sections.

References Cited by the Examiner

UNITED STATES PATENTS

| | | | |
|---|---|---|---|
| 1,290,590 | 1/19 | Lehew | 285—409 |
| 1,957,805 | 5/34 | Rich | 285—420 |
| 3,070,388 | 12/62 | Werth | 285—411 |

FOREIGN PATENTS

| | | |
|---|---|---|
| 937,264 | 12/55 | Germany. |
| 781,761 | 8/57 | Great Britain. |

CARL W. TOMLIN, *Primary Examiner.*